Figure 1:
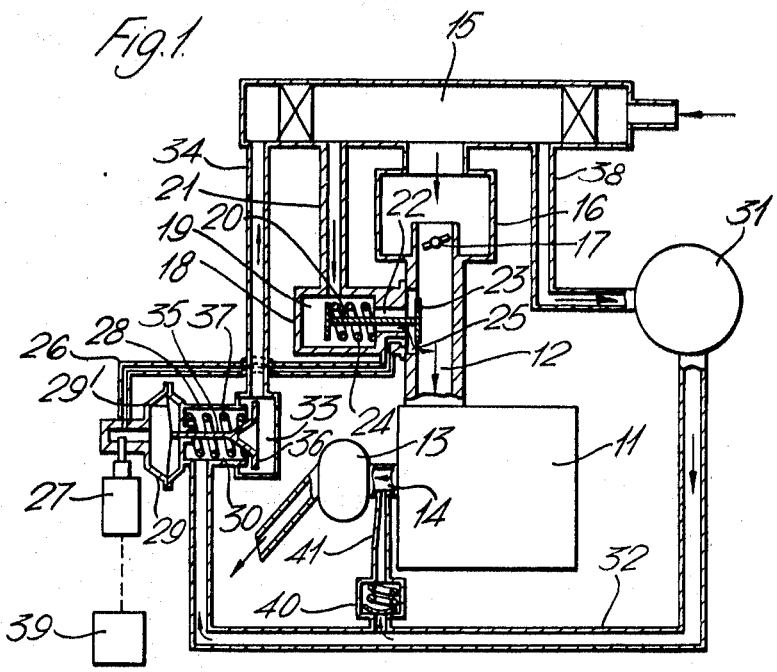

United States Patent [19]
Tatsutomi et al.

[11] 3,738,109
[45] June 12, 1973

[54] EXHAUST GAS PURIFYING SYSTEM

[75] Inventors: Yasuo Tatsutomi, Shigetake Yoshimura, both of Hiroshima, Japan

[73] Assignee: Toyo Kogyo Co., Ltd., Hiroshima-Ken, Japan

[22] Filed: Jan. 13, 1971

[21] Appl. No.: 106,092

[30] Foreign Application Priority Data
Jan. 14, 1970 Japan.................................. 45/4112
Jan. 14, 1970 Japan.................................. 45/4113

[52] U.S. Cl............. 60/290, 123/119 D, 123/124 B
[51] Int. Cl............................................. F02b 75/10
[58] Field of Search................... 60/30 R, 289, 290; 123/124 R, 124 B, 119 D

[56] References Cited
UNITED STATES PATENTS
3,287,899  11/1966  Bintz............................... 123/119 D
3,364,909  1/1968  Mick................................ 123/124 R
3,392,523  7/1968  Hyde................................. 60/30 R
3,430,437  3/1969  Saussele............................ 60/30 R
3,433,242  3/1969  Voorheis............................ 60/30 R
3,533,386  10/1970  Masaki............................. 123/119 D
3,591,961  7/1971  Woodward........................... 60/30 R Primary Examiner—Douglas Hart
Attorney—Craig and Antonelli

[57] ABSTRACT

A system for purifying an exhaust gas of an internal combustion engine for controlling the flow of a primary air to be supplied to an inlet manifold to give a proper air-fuel mixture ratio in accordance with the opening of the throttle valve and for controlling the flow of a secondary air to be supplied to an exhaust manifold to enable the reactor to effect the reduction of unburned compounds present in the exhaust system in accordance with the vehicle driving condition. To this end, there is provided a relief valve operable in accordance with the opening of the throttle valve and concurrently in accordance with the engine speed.

9 Claims, 3 Drawing Figures

INVENTORS
YASUO TATSUTOMI AND SHIGETAKE YOSHIMURA
BY Craig, Antonelli,
Stewart & Hill
ATTORNEY

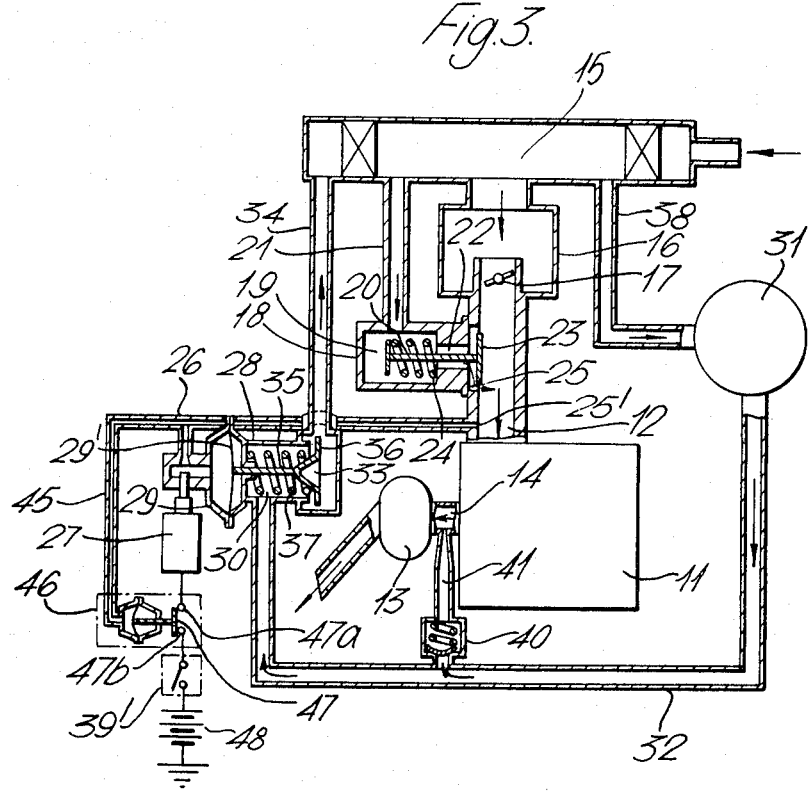

EXHAUST GAS PURIFYING SYSTEM

The present invention relates to an improved system for purifying an exhaust gas of an internal combustion engine and, more particularly, to an exhaust gas purifying system of compact and simplified arrangement operable in such a manner as to permit the flow of the primary air to the inlet manifold when the vehicle to which the system of the present invention is adapted is decelerated irrespective of the engine speed and to permit the flow of the secondary air to the exhaust manifold when the vehicle is normally driven while the engine speed is low.

It has been well known that a ratio of air-fuel mixture used to drive an internal combustion engine, for example, of an automotive vehicle is usually adjusted so that the air-fuel mixture can undergo a complete combustion within the combustion chambers of the automotive vehicle. However, even if the air-fuel mixture ratio is properly adjusted, an incomplete combustion of the air-fuel mixture often occurs due to the fact that the temperature of the inner cylinder wall surrounding the combustion chambers is relatively low when the engine is driven at a low speed. In such case, an exhaust gas will contain a large amount of unburned compounds which will pollute the atmosphere when it is emerged from the exhaust system of the automotive vehicle.

In view of the above fact, recently it has been proposed to provide a reactor in the exhaust system of the automotive vehicle for treating the unburned compounds present in the exhaust gas of an internal combustion engine by applying a secondary air thereto and then to discharge the purified exhaust gas into the atmosphere.

However, when the throttle valve in the carburetor is closed so that the vehicle is decelerated, the amount of air to be mixed with the fuel is usually controlled to a proper value while the amount of the fuel cannot be controlled to a proper value in the presence of negative pressure of a high value generated within the inlet manifold. Accordingly, the air-fuel mixture of relatively high concentration will be supplied to the combustion chambers, resulting in that the mixture cannot be completely burned. If the exhaust gas containing the unburned compounds is emerged from the exhaust system, after-burn of the unburned compounds in the presence of air will take place outside the exhaust system or in the reactor disposed in the exhaust system.

Accordingly, one object of the present invention is to provide a system for purifying an exhaust gas of an internal combustion engine wherein the provision is made to control a primary air to be introduced into the inlet manifold and a secondary air to be introduced in the exhaust manifold respectively in accordance with the engine driven condition.

Another object of the present invention is to provide a system for purifying an exhaust gas of an internal combustion engine by which unburned compounds present in the exhaust gas can be advantageously reduced prior to the discharge thereof into the atmosphere.

A further object of the present invention is to provide a system for purifying an exhaust gas of an internal combustion engine adaptable in the exhaust system of an automotive vehicle including a thermal reactor, wherein the provision is made to protect the reactor which is often exposed to the relatively higher temperature when the engine is driven at a high speed.

According to the present invention, there is provided a system by which the supply of a primary air to the inlet manifold can be properly controlled to give a favorable air-fuel mixture ratio to suit the engine speed. In addition thereto, the system of the character above referred to can be effective to treat or purify the unburned compounds present in the exhaust gas by means of a reactor only when the exhaust system of an automotive vehicle is in condition that an exhaust gas containing a large amount of unburned compounds is to be discharged into the atmosphere.

More specifically, the exhaust gas purifying system of the present invention comprises a pressure sensitive valve operable in such a manner that, when the vehicle is decelerated, said pressure sensitive valve can be brought into the open position, irrespective of the engine speed, to permit the supply of a primary air into an inlet manifold therethrough so as to give a proper air-fuel mixture ratio whereby the air-fuel mixture can be completely burned in the combustion chambers of an internal combustion engine. At the same time, the unnecessary supply of a secondary air to the reactor can be regulated whereby the cooling of the reactor can be advantageously prevented.

In addition thereto, one essential feature of the present invention resides in the fact that, since the system, of the present invention is designed such that the secondary air can be advantageously supplied to the reactor when the engine speed is low while the vehicle is normally driven, the amount of unburned compounds present in the exhaust gas can be appreciably reduced.

Another essential feature of the present invention resides in the fact that, since the system of the present invention is also designed such that the provision has been made to cease the supply of the secondary air to the reactor when the engine speed is high irrespective of the vehicle driving condition, the treatment of the unburned compounds within the reactor does not take place so that the temperature within the reactor can be prevented from unnecessarily increasing. This will result in the favorable improvement of the life of the reactor.

As hereinbefore described, the exhaust gas purifying system of the present invention is effective to prevent the discharge of harmful substances from the exhaust system of an automotive vehicle into the atmosphere and concurrently effective to prevent the occurrence of after-burn which often takes place when the vehicle is decelerated.

Figure 2:
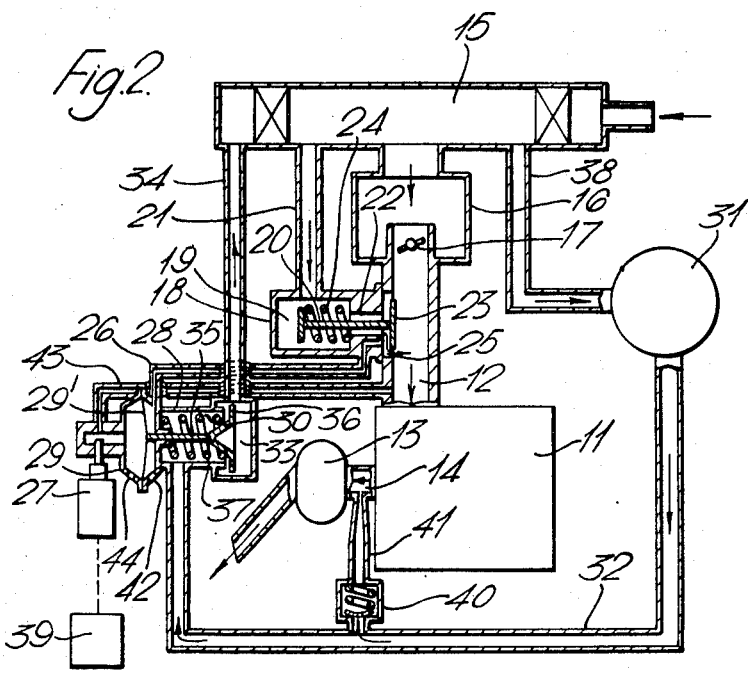

These and other objects and features of the present invention will become apparent to those skilled in the art from the following detailed description of the present invention taken in conjunction with the accompanying drawings, wherein preferred embodiments thereof are shown only for illustrative purposes. Reference is made to the accompanying drawings, in which;

FIG. 1 is a schematic diagram of a system embodying the principle of the present invention for purifying an exhaust gas of an internal combustion engine, FIG. 2 is a similar diagram to FIG. 1, showing another preferred embodiment of the present invention, and FIG. 3 is a similar diagram to FIG. 1, showing a further preferred embodiment of the present invention.

Before the description proceeds, it is to be noted that like parts are designated by like reference numerals throughout the drawings.

Referring now to FIG. 1, an internal combustion engine 11 so far described may be of any construction and, as well known in the art, includes a plurality of combustion chambers (not shown) to which an air-fuel mixture is supplied through an inlet manifold 12. The exhaust gas produced in the combustion chambers is adapted to be discharged into the atmosphere by means of an exhaust system including a reactor 13 for effecting the reduction, elimination and oxidation of unburned compounds contained in the exhaust gas and an exhaust manifold 14 connecting between said combustion chambers and said reactor 13.

The inlet manifold 12 has one end connected with the combustion chambers as previously described and the other end connected with an air cleaner 15 through a conventional carburetor 16, the latter being shown as including therein a throttle valve 17.

Rigidly fitted to the outer wall of the inlet manifold 12 is a pressure sensitive valve 18 formed with a working chamber 19 in which a piston member 20 is operatively accommodated. The working chamber 19 of this pressure sensitive valve 18 is communicated with the air cleaner 15 through a suitable conduit 21 and also with the interior of the inlet manifold 12 through a bore 22 formed in said valve 18. The piston member 20 is extended through said bore 22 and rigidly connected with a closure member 23 which is exposed to the interior of the inlet manifold 12. This piston member 20 is normally urged to the left by the action of a resilient member 24, for example, a compression spring, housed in the working chamber 19, so as to close said bore 22.

This pressure sensitive valve 18 so far described can be operated in such a manner that, when a negative pressure of sufficient value is generated in the inlet manifold 12, the piston member 20 is moved to the right against the resilient member 24 thereby to communicate the air cleaner 15 to the interior of the inlet manifold 12 through the working chamber 19.

Disposed in the close vicinity of said bore 22 is an opening 25 connected with one end of a passage 26 of which the other end is connected with a solenoid valve 27, so that said passage can be communicated with the inlet manifold 12 whenever the pressure sensitive valve 18 is in position to shut off the communication between the air cleaner 15 to the interior of the inlet manifold 12 through the working chamber 19, but that the value of pressure within said passage 26 can be substantially equalized to that of the atmospheric pressure even when the negative pressure of sufficient value is generated in the inlet manifold 12 when the vehicle is decelerated and the valve 18 is accordingly brought into the position to permit the flow of air from the air cleaner 15 to the interior of the inlet manifold 12.

A relief valve generally indicated by 28 comprises a diaphragm chamber 29 having first and second rooms therein divided by a diaphragm 29', a first working chamber 30 connected with an air feeder device 31 through a suitable conduit 32, and a second working chamber 33 connected with the air cleaner 15 through a suitable conduit 34. This relief valve 28 further includes a piston member 35, one end of which being rigidly connected with the diaphragm 29' while the other end being rigidly connected with a closure member 35 adapted to enclose the first working chamber 30. This piston member 35 is normally urged to the right by the action of a resilient member 37, for example, a compression spring, disposed between the depth of the first working chamber 30 and the closure member 36 around said piston member 35. The air feeder device 31 is in turn connected with the air cleaner 15 through a suitable conduit 38.

The other end of the passage 26 connected with the solenoid valve 27 as previously mentioned is in turn connected with the first room of the diaphragm chamber 29 of the relief valve 28. The solenoid valve 27 is electrically connected with a detector 39 for detecting the engine speed and adapted to close the communication between the passage 26 and the first room of the diaphragm chamber 29 when an electric signal representative of the high engine speed is applied thereto by the detector 39 and to permit the communication therebetween when an electric signal representative of the low engine speed is applied thereto by the detector 39, irrespective of the vehicle driving condition.

Disposed in shunt with the conduit 32 is a check valve 40 which is in turn connected with the exhaust manifold 14 at an intermediate position between the engine 11 and the reactor 13 through an elongated nozzle 41.

In the arrangement of the exhaust gas purifying system of the present invention as hereinbefore fully described, when the engine speed is high during a period in which an automotive vehicle is normally driven, the throttle valve 17 is in the full open position and the value of pressure within the inlet manifold 12 is therefore small. In this condition, the solenoid valve 27 is in position to close the communication between the passage 26 and the first room of the diaphragm chamber 29. However, a secondary air supplied to the first working chamber 30 from the air cleaner 15 through the conduit 32 by means of the air feeder device 31 passes through the second working chamber 33 of the relief valve 28 into the air cleaner 15. The check valve 40 is at this time closed since the value of pressure in the conduit 32 is small enough to maintain said check valve 40 in the closed position.

When the engine speed is reduced to a smaller value during the same period, negative pressure will be generated in the inlet manifold 12. However, the value of the negative pressure is still as small as the pressure sensitive valve 18 cannot be operated. On the other hand, the solenoid valve 27 is at this time brought into the open position to establish the communication between the passage 26 and the first room of the diaphragm chamber 29 whereby the negative pressure within the inlet manifold 12 acts to draw the pressure in the passage 26 and thus in the first room of the diaphragm chamber 29 of the relief valve 28, resulting in that the piston member 35 of the relief valve 28 is moved to the left against the resilient member 37 thereby to close the communication between the conduits 32 and 34. Upon closure of the communication between the conduits 32 and 34, the value of the air pressure in the conduit 32 commences to increase whereby the check valve 40 can be operated so as to permit the flow of the secondary air to the exhaust manifold 14 through the elongated nozzle 40. The secondary air thus supplied to the exhaust manifold 14 flows to the reactor 13 wherein, with this secondary air thus supplied, unburned compounds present in the exhaust gas can be purified.

In the case where the throttle valve 17 is brought into the closed position so that an automotive vehicle can be decelerated, the value of the negative pressure within the inlet manifold 12 increases to a high value sufficient to overcome the resilient force of the resilient member 24, irrespective of the engine speed, thereby to cause the piston member 20 of the pressure sensitive valve 18 to move to the right as shown in FIG. 1. As the piston member 20 moves to the right, a primary air is permitted to flow from the air cleaner 15 through the working chamber 19 to the interior of the inlet manifold 12 wherein said primary air is utilized to give an appropriate air-fuel mixture ratio. However, if the engine speed is high while the throttle valve 17 is in the closed position, the relief valve 28 is in position to permit the flow of the secondary air from the conduit 32 to the conduit 34 in a similar manner as hereinbefore described. On the contrary thereto, if the engine speed is low while the throttle valve 17 is in the closed position, the solenoid valve 27 is in position to permit the communication between the passage 26 and the first room of the diaphragm chamber 29 of the relief valve 28. However, since the opening 25 connected with the adjacent end of the passage 26 is disposed in the close vicinity of the bore 22 of the pressure sensitive valve 18 as hereinbefore described, the value of the pressure in the passage 26 and thus in the first room of the diaphragm chamber 29 is substantially equalized to the value of pressure in the working chamber 19 of the valve 18 and thus the value of the atmospheric pressure. Therefore, the secondary air is permitted to flow from the conduit 32 to the conduit 34 and then to the air cleaner 15 without operating the check valve 40.

The operational relation of the various valves employed in the preferred embodiment of the system of the present invention will be tabulated below for better understanding of the principle of the present invention.

| Engine Speed | High | | Low | |
|---|---|---|---|---|
| Vehicle Driving Condition | Normal | Decelerated | Normal | Decelerated |
| Pressure Sensitive Valve | Closed | Open | Closed | Open |
| Solenoid Valve | Closed | Closed | Open | Open |
| Relief Valve | Open | Open | Closed | Open |
| Check Valve | Closed | Closed | Open | Closed |
| Primary Air* | No | Yes | No | Yes |
| Secondary Air** | No | No | Yes | No |

(NOTE:) * No; Not supplied to the inlet manifold.
Yes; Supplied to the inlet manifold.
** No; Not supplied to the exhaust manifold.
Yes; Supplied to the exhaust manifold.

In FIG. 2, another preferred embodiment of the present invention is shown wherein a modification is made in the connection between the pressure sensitive valve 18 and the relief valve 28, both shown in FIG. 1.

In the second preferred embodiment of the present invention shown in FIG. 2, the opening 25 is adapted to be closed by the closure member 23 connected with the piston member 20 of the pressure sensitive valve 18 only when the piston member 20 is moved to the left by the resilient member 24 so as to close the bore 22. Nevertheless, this opening 25 is so situated in a similar manner as in the first embodiment that, when the piston member 20 is moved to the right so as to permit the flow of air from the air cleaner 15 to the interior of the inlet manifold 12, the value of pressure in the passage 26 can be substantially equalized to the value of the atmospheric pressure. It is also to be noted that the other end of said passage 26 is in the instance as shown in FIG. 2 connected with the second room of the diaphragm chamber 29 of the relief valve 28 which is in turn communicated with the atmosphere through a balance hole 42 of small diameter formed in a wall portion of said diaphragm chamber 29. An additional passage 43 has one end connected with the first room of the diaphragm chamber 29 through the solenoid valve 27 and the other end connected with the inlet manifold 12. Even the first room of the diaphragm chamber 29 is communicated with the atmosphere through another balance hole 44 of large diameter formed in another wall portion of said diaphragm chamber 29.

In the arrangement as hereinbefore described, when the engine speed is low while the vehicle is normally driven, the pressure sensitive valve 18 is maintained in the closed position. However, since negative pressure is generated in the inlet manifold 12 and the solenoid valve 27 is in the open position in a similar manner as hereinbefore described in connection with the first embodiment of the present invention, the pressure within the passage 43 can be drawn whereby the piston member 35 of the relief valve 28 can be quickly moved to the left so as to enclose the first working chamber 30 of the relief valve 28, resulting in that the secondary air can be supplied to the reactor 13 through the check valve 40. However, it is to be noted that the amount of air drawn through the passage 43 to the inlet manifold 12 under the influence of the negative pressure is at this time greater than the amount of air drawn from the atmosphere into the first room of the diaphragm chamber 29 through the balance hole 44.

When the negative pressure reaches to the sufficient value, i.e., when the vehicle is decelerated while the engine speed is low, the piston member 20 of the pressure sensitive valve 18 can be moved to the right under the influence of the negative pressure within the inlet manifold 12 so as to open the bore 22 whereby the primary air can be supplied from the air cleaner to the inlet manifold 12 through the working chamber 19 of the pressure sensitive valve 18. At this time, since the opening 25 connected with the passage 26 is disposed in the close vicinity of the bore 22, the value of pressure in the passage 26 becomes larger than that within the inlet manifold 12. On the other hand, the value of pressure in the passage 43 is equal to that within the inlet manifold 12. Accordingly, since the diameter of the balance hole 44 is larger than that of the balance hole 42, a small amount of air can be introduced into the second room of the diaphragm chamber 29 and then flows in the passage 26 while a large amount of air can be introduced into the first room of the diaphragm chamber 29 whereby the values of pressure in the both rooms of the diaphragm chamber 29 can be substantially equalized and the piston member 35 of the relief valve 28 can be quickly moved to the right by the resilient member 37. Thus, it will be understood that the secondary air supplied through the conduit 32 can be fed back to the air cleaner 15 through the second chamber 33 of the relief valve 28 without operating the check valve 40.

As hereinbefore described, the exhaust gas purifying system of the present invention in the second embodiment can operate substantially in the same manner as in the first embodiment.

A third preferred embodiment of the present invention is a modification directed to the first embodiment hereinbefore described with reference to FIG. 1, wherein the opening 25' is located apart from the bore 22 of the pressure sensitive valve 18.

Referring now to FIG. 3, the passage 26 is employed to connect the opening 25' and the first room of the diaphragm chamber 29 substantially in the same manner as in the disclosure of the first preferred embodiment shown in FIG. 1. However, the other end of said passage 26 connected with the first room of the disphragm chamber 29 is also connected in shunt with a passage, indicated by 45, which is in turn connected with a vacuum switch device 46. This vacuum switch device 46 includes a movable contact 47 and a pair of fixed contacts 47a and 47b to be bridged by said movable contact 47 and operable in such a manner that, while the movable contact 47 is normally urged to bridge or close the fixed contacts 47a and 47b, the fixed contacts 47a and 47b can be opened only when the pressure in the passages 26 and 45 is drawn by the high negative pressure within the inlet manifold 12 during the deceleration of the vehicle.

The fixed contact 47a is connected with the solenoid valve 27 so as to operate the latter while the fixed contact 47b is connected with a detector switch 39' adapted to be closed so as to supply current to the solenoid valve 27 through the vacuum switch device 46 from a power source 48 only when the engine speed is low irrespective of the vehicle driving condition.

In the arrangement as hereinbefore described, it will be apparently understood that the vacuum switch device 46 and the detector switch 39' can be brought into the closed position at the same time only when the vehicle is normally driven while the engine speed is low.

Nevertheless, when the both vacuum switch device 46 and detector switch 39' are closed at the same time, the solenoid valve 27 can be brought into the open position thereby to move the piston member 35 of the relief valve 28 to the left to enclose the first working chamber 30 of the relief valve 28. As a result thereof, the value of pressure in the conduit 32 increases to the value sufficient enough to open the check valve 40 and, thus, the secondary air can be supplied to the reactor 13 substantially in the same manner as hereinbefore described.

In the foregoing embodiments of the present invention, the detector has been employed to detect the engine speed. However, it is to be noted that this detector may be employed to detect the vehicle speed. Furthermore, instead of the pressure sensitive valve, a poppet valve may be incorporated in the throttle valve for supplying the primary air to the inlet manifold only when the vehicle is decelerated. Other modification and change are apparent to those skilled in the art and, therefore, the present invention is not to be limited to the foregoing preferred embodiments. Accordingly, such modification and change should be construed as included in the following scope of claim of the present invention.

What is claimed is:

1. A system for purifying exhaust gases of an internal combustion engine of the type used to propel an automotive vehicle; said system comprising: a pressure sensitive valve for supplying primary air to an inlet manifold of the engine when the vehicle is being decelerated, an air feeder for furnishing a supply of secondary air, a nozzle disposed on an exhaust system of the engine, a conduit connecting said air feeder to said nozzle for conducting secondary air to the engine exhaust system through said nozzle, a relief valve communicating with said conduit for discharging the secondary air in said conduit to the atmosphere when said relief valve is opened, means for preventing the supply of secondary air to said nozzle when said relief valve is opened, first detecting means including passage means communicating with the inlet manifold of the engine for detecting the deceleration condition of the vehicle, and second detecting means for detecting the engine speed, said relief valve being controlled by both said first and second detecting means such that said relief valve is closed when the vehicle is in a non-deceleration condition with the engine speed below a predetermined value and is open when the vehicle is in a deceleration condition and when the engine speed is above said predetermined value, whereby the primary air is supplied to the inlet manifold when the vehicle is decelerated irrespective of the engine speed and whereby the secondary air is supplied to the engine exhaust system when the vehicle is in a non-deceleration condition while the engine speed is below a predetermined value, wherein said passage means is connected to said relief valve, and wherein said second detecting means is disposed operably so as to permit the communication between said passage means and said relief valve when the engine speed is below said predetermined value and to interrupt the communication therebetween when the engine speed is above said predetermined value.

2. A system for purifying exhaust gases of an internal combustion engine of the type used to propel an automotive vehicle; said system comprising: a pressure sensitive valve for supplying primary air to an inlet manifold of the engine when the vehicle is being decelerated, an air feeder for furnishing a supply of secondary air, a nozzle disposed on an exhaust system of the engine, a conduit connecting said air feeder to said nozzle for conducting secondary air to the engine exhaust system through said nozzle, a relief valve communicating with said conduit for discharging the secondary air in said conduit to the atmosphere when said relief valve is opened, means for preventing the supply of secondary air to said nozzle when said relief valve is opened, first detecting means including passage means communicating with the inlet manifold of the engine for detecting the deceleration condition of the vehicle, and second detecting means for detecting the engine speed, said relief valve being controlled by both said first and second detecting means such that said relief valve is closed when the vehicle is in a non-deceleration condition with the engine speed below a predetermined value and is open when the vehicle is in a deceleration condition and when the engine speed is above said predetermined value, whereby the primary air is supplied to the inlet manifold when the vehicle is decelerated irrespective of the engine speed and whereby the secondary air is supplied to the engine exhaust system when the vehicle is in a non-deceleration condition while the engine speed is below a predetermined value, wherein said relief valve includes a diaphragm device having first and second diaphragm chambers, wherein said passage means is communicated with said first diaphragm chamber of said diaphragm device, wherein said second detecting means includes a solenoid valve disposed on said passage means, and wherein said solenoid valve operates to permit the communication between said passage means and said first diaphragm chamber when the engine speed is below said predetermined value and to interrupt the communication therebetween when the engine speed is above said predetermined value.

3. A system as claimed in claim 1, wherein said means for preventing the supply of secondary air to said nozzle whenever said relief valve is opened includes a check valve disposed on said conduit between said nozzle and said relief valve for preventing the secondary air supply to the engine exhaust system except when the pressure in said conduit reaches a predetermined value.

4. A system as claimed in claim 1, wherein said air feeder is an air pump connected between an engine air cleaner and said conduit.

5. A system as claimed in claim 2, wherein said means for preventing the supply of secondary air to said nozzle whenever said relief valve is opened includes a check valve disposed on said conduit between said nozzle and said relief valve so as to permit the secondary air supply to the engine exhaust system when the pressure in said conduit reaches a predetermined value.

6. A system as claimed in claim 2, wherein said air feeder is an air pump connected between the air cleaner and said conduit.

7. A system as claimed in claim 2, wherein the end of said passage means connected with the inlet manifold is positioned in the close vicinity of said pressure sensitive valve so that the value of pressure in said passage means can be substantially equalized to the value of pressure of the primary air supplied to the inlet manifold through said pressure sensitive valve when said pressure sensitive valve is opened and substantially equalized to the value of pressure of the inlet manifold when said pressure sensitive valve is closed, whereby said relief valve is closed when the negative pressure in the inlet manifold is applied to said first diaphragm chamber of said diaphragm device.

8. A system as claimed in claim 2, wherein said first diaphragm chamber has a balance hole communicating with the atmosphere, wherein said second diaphragm chamber has a balance hole of a diameter smaller than that of said first diaphragm chamber, wherein said passage means includes a first passage and second passage, said first passage being communicated with the first diaphragm chamber at one end of said first passage and with the inlet manifold at the other end thereof, and said second passage being communicated at one end of said second passage with said second diaphragm chamber and at the other end thereof with the inlet manifold in the close vicinity of said pressure sensitive valve so as to be closed upon closure of said pressure sensitive valve.

9. A system as claimed in claim 2, wherein said passage means has one end communicated with the inlet manifold and the other end thereof communicated with the first diaphragm chamber and a branched passage branching from said passage means connected to a vacuum switch, said vacuum switch being opened to cut the operation of said solenoid valve when the vehicle is decelerated.

* * * * *